Figure 1:
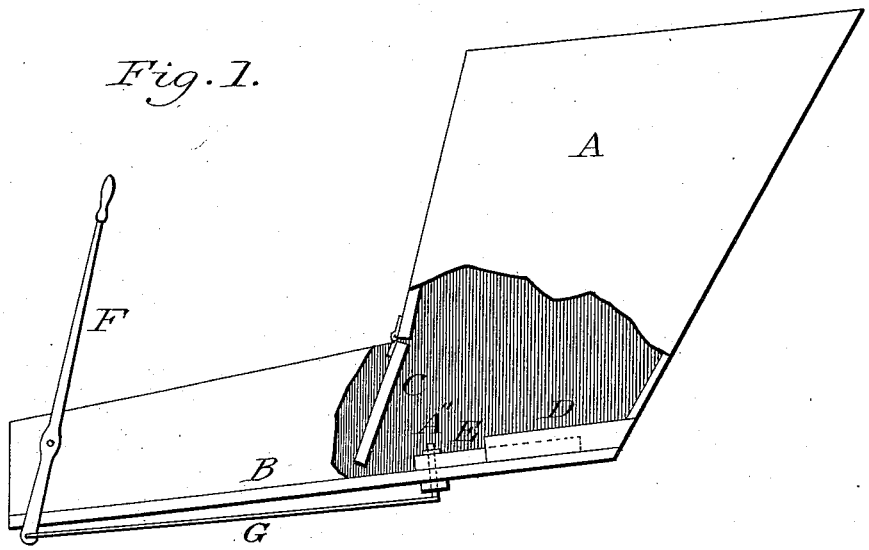

(No Model.)

A. L. GILL.
POTATO PLANTER.

No. 333,460. Patented Dec. 29, 1885.

Witnesses:
Alx. Scott
Jas. W. Groham

Inventor:
A. L. Gill
Per Jas. Buchanan
Atty

UNITED STATES PATENT OFFICE.

ALBERT L. GILL, OF ALLENTOWN, NEW JERSEY.

POTATO-PLANTER.

SPECIFICATION forming part of Letters Patent No. 333,460, dated December 29, 1885.

Application filed July 23, 1885. Serial No. 172,384. (No model.)

*To all whom it may concern:*

Be it known that I, ALBERT L. GILL, a citizen of the United States, residing at Allentown, in the county of Monmouth and State of New Jersey, have invented a certain new and useful Improvement in Potato-Planters, of which the following is a specification.

My invention relates to a new and useful device for feeding the potatoes from the main hopper to the receptacle from whence they are taken by the pickers. In practice it has been found that the potatoes become wedged together at and near the bottom of the hopper, and either do not flow out freely, or refuse to flow at all. By a simple and inexpensive device, which I have invented and herein described, I break up any wedging at the will of the operator and assist in the flow at any time it is even partially interrupted. This device is shown in the accompanying drawings.

In the drawings similar parts are indicated by similar letters of reference.

Figure 2:
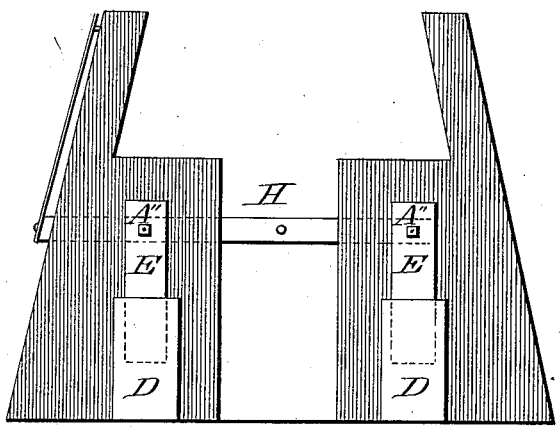

Figure 1 shows a side view of my device attached to the hopper of a potato-planter. Fig. 2 shows a top view looking down into the hopper.

In Fig. 1, A is the hopper. A portion of the side of this hopper is shown cut away to show a side view of a portion of my device.

B is the short trough or lead, within which the potatoes enter from the hopper A and where the pickers receive them. These pickers and their manner of receiving the potatoes are not shown, as they comprise no part of nor are essential to the present invention.

As will be seen by Fig. 2, the hopper is in two parts. At the foot of each part is placed the door C. This door is hinged to the front of the hopper. It is weighted and its office is to regulate the flow of potatoes. In practice it is found difficult to regulate the flow at this point, the tendency to wedge being great. To the bottom of the hopper I fasten sheaths D. Upon the bottom I also place feeders F. These feeders move freely up and down the bottom of the hopper, their upper ends entering within the sheaths D. This up-and-down movement of these feeders E breaks up any wedging and forces the potatoes out under the door C. To impart this up-and-down movement I employ the lever F. This lever is within handy reach of the driver or operator. It is connected by the rod G with the rocking bar H, connected through slots in the bottom of the hopper A with the feeders E E and pivoted midway between such connections.

Fig. 2 shows a top view of the sheaths D, feeders E, rod G, and also by dotted lines the rocking bar H. It will be seen that by rocking the lever F, there will be imparted, by means of the rod G and bar H, an up-and-down motion along the bottom of the hopper A to the feeders E E. This motion may be at the will of the operator by the use of the lever F, or indifferently it may be automatic by connecting the rod G with the operating mechanism of the planter.

The sheaths D serve the purpose of preventing the potatoes from wedging behind the feeders E E and impeding their backward motion.

What I claim as my invention, and desire to secure by Letters Patent, is—

1. In a potato-planter, the hopper A, provided with the sheaths D D, and feeders E E, substantially as shown and described.

2. In a potato-planter, the hopper A, provided with the doors C, in combination with the feeders E E, substantially as shown and described.

3. In a potato-planter, the hopper A, provided with doors C, in combination with the feeders E E, such feeders provided with the sheaths D D, substantially as shown and described.

4. In a potato-planter, the feeders E E, provided with the sheaths D D, and operated by the rocking bar H, substantially as shown and described.

5. In a potato-planter, the hopper A, in combination with the feeders E E, such feeders provided with sheaths D D, and operated by the rocking bar H, substantially as shown and described.

ALBERT L. GILL.

Witnesses:
 Jos. E. HUNT,
 J. BUCHANAN.